US005409565A

United States Patent [19]

Achelpohl et al.

[11] Patent Number: 5,409,565

[45] Date of Patent: Apr. 25, 1995

[54] APPARATUS FOR THE APPLICATION OF PREFERABLY ADHESIVE COATED SLIPS OR PIECES OF TUBE TO A MOVING WEB OR TO WORKPIECES BEING CONVEYED

[75] Inventors: Fritz Achelpohl; Helmut Simon, both of Lengerich, Germany

[73] Assignee: Windmoller & Holscher, Lengerich, Germany

[21] Appl. No.: 976,068

[22] Filed: Nov. 13, 1992

[30] Foreign Application Priority Data

Nov. 13, 1991 [DE] Germany ........................ 41 37 349.9

[51] Int. Cl.[6] .............................................. B32B 31/04

[52] U.S. Cl. .................................... 156/516; 156/517; 156/519; 156/521; 156/552; 156/556; 156/559; 156/560; 156/561; 156/562; 156/567; 156/568; 156/578

[58] Field of Search ............... 156/516, 517, 519, 521, 156/552, 556, 557, 559, 560, 561, 562, 566, 567, 568, 578, 529, 538

[56] References Cited

U.S. PATENT DOCUMENTS 3,408,908 11/1968 Berkowitz ........................... 156/521
3,429,237 2/1969 Subklew ............................. 156/562
3,707,422 12/1972 Helm .................................. 156/560
3,745,893 7/1973 Helm et al. .......................... 156/521

*Primary Examiner*—Caleb Weston
*Attorney, Agent, or Firm*—Keck, Mahin & Cate

[57] ABSTRACT

An apparatus for the application of adhesive coated slips to a moving web or to workpieces being conveyed, and preferably to the drawn up and still open bottoms of bags, consists of pairs of feed rolls for a web of material and means for perforating and tearing off, or means for detaching, the slips from the web of material and of a transfer folding gripper cylinder for receiving and subsequent transfer of the slips or pieces of tube. In order to be able to apply additional slips between an applying folding gripper cylinder (9) for the application of the slips and the transfer folding cylinder (6) there is an intermediate cylinder (7), which with the applying folding cylinder (9) defines a roll nip, into which slips run, which are torn off or otherwise detached along lines of perforations from a second web (10) of material are inserted, and which transfers the slips or pieces of tube which are torn off or otherwise detached from the first and the second web of material in an at least partly overlapping condition to the web or, respectively, workpieces (12) passing through the device.

7 Claims, 2 Drawing Sheets

APPARATUS FOR THE APPLICATION OF PREFERABLY ADHESIVE COATED SLIPS OR PIECES OF TUBE TO A MOVING WEB OR TO WORKPIECES BEING CONVEYED

FIELD OF THE INVENTION

The present invention relates to an apparatus for the application of preferably adhesive coated slips or pieces of tube to a moving web or to workpieces being conveyed, and preferably to the drawn up and still open bottoms of bags, comprising pairs of feed rolls for a web of material and means for perforating and tearing off or means for detaching the slips or pieces of tube from the web of material and a transfer folding gripper cylinder for receiving and then transfering the slips or pieces of tube.

BACKGROUND OF THE INVENTION

If the slips are applied to the drawn up and still open bottoms of bags, then it is a question of closing tabs or reinforcing slips or valves. A known device in accordance with the German patent publication 1,179,087 C of the type initially mentioned draws a paper web and a synthetic resin web simultaneously from two supply rolls in superposed relationship, the two-layer web being provided with transverse perforations by perforating knives with a spacing equal to the size of the slips. One web is then lifted by a guide roll and then placed back on the other web with an off-set, The mutually off-set double sheets are then torn off from the web by causing folder grippers of the transfer folder gripper cylinder to grip the leading end of the double web so that the web is held fast behind the lines of perforations, The slips conveyed by the transfer cylinder are then provided with coatings of adhesive by an adhesive application roll of an adhesive application device in accordance with the desired format, whereafter the slips are applied by the transfer folder gripper cylinder to the opened bottoms, which run through tangentially in relation to the latter. By folding together the bottoms a filling valve is then formed in each of them, the synthetic resin ply of the double slips projecting further into the interior of the bag than the paper ply so that the inwardly projecting end of the piece of synthetic resin tube may fold up and collapse under the filling pressure and may perform its sealing function, There are applications in which it is necessary to apply a further slip or piece of tube in addition to the slip torn off a web or the double slip torn from a double web in order to keep to other requirements as regards production.

For example there is in practice a need to apply an additional piece of tube on the slip applied to the bottom, which is shorter than the slips and in the folded condition of the bottom projects to the outside so that after filling the bag there is a possibility of sealing it off by welding or bonding the piece of tube projecting to the outside.

In other cases it is necessary to provide the valves with a venting means so that air trapped in the bag may escape. This is done by at least partly enveloping the valve in a slip of non-woven material which permits discharge of air.

In order to apply an additional slip or a piece of tube on the valve slip or slips or in order to surround the filling valve constituted by the valve slip a ply of non-woven material for venting off air, it is necessary in the case of the known device to provide a further device after the latter (as seen in the direction of movement of the bag bottom) by which individual pieces are detached from a tubular web and are placed in the open bottom on the slips which are already applied, or however to provide a means upstream from the device, which for instance applies the nonwoven material strips serving for the escape of air. Therefore in order to improve upon the known device in the manner described it is necessary to provide additional assemblies, which however increase the length of the apparatus and increase its price. Furthermore it is only possible to upgrade the known device at a reasonable expense in such a manner that such means for the application of additional slips or for the application of strips of non-woven material are placed downstream and/or upstream from it.

SUMMARY OF THE INVENTION

Accordingly one object of the invention is to provide a device of the type initially mentioned which additional slips, pieces of tube or plies of non-woven material may economically be applied to workpieces, and more particularly to the bottoms of bags. In this respect the device should be so designed that its overall length is not increased. Furthermore, there is to be a possibility of upgrading existing equipment and plant at a reasonable expense.

In the case of a device of the type initially mentioned this aim is to be achieved by the present invention by the arrangement between an applying folding gripper cylinder for the application of the slips and/or the pieces of tube, and the transfer folding cylinder of an intermediate cylinder, which the applying folding cylinder defines a roll nip, into which slips or pieces of tube run, which are torn off or otherwise detached along lines of perforations from a second web of material, and which transfers the slips or pieces of tube which are torn off or otherwise detached from the first and the second web of material in an at least partly overlapping condition to the workpieces or, respectively, bottoms passing through the device. In the device in accordance the invention for the application of additional slips, pieces of tube OF inlays complete applying devices are avoided, since the additional slips, pieces of tube or inlays are combined even prior to application to the bottoms or workpieces, together as units to be applied, which are then jointly applied in one working step correct alignment the format. The device in accordance the invention is consequently responsible not only for a reduction of the overall length but furthermore and more particularly to a reduction of the application rolls, since two lines of slips operate on a common application folding gripper cylinder.

In accordance a further possible development the intermediate cylinder is provided a row of needles or the like in order to receive the slips or the like from the transfer cylinder.

It is possible for the intermediate cylinder to be in engagement a glue application cylinder belonging to a glue application system, which furnishes the slips or the like with coatings of glue aligned with the format thereof.

A further advantageous feature of the invention is such that the intermediate cylinder is provided a folder bar or the like in front of the row of needles in terms of the direction of rotation, which folder bar inserts the leading end of the slip or the like which is torn off or detached into a folding gripper of the application cylinder, During further movement through the system the coating of glue on the slip or double slip retained on the intermediate cylinder comes into contact with the slip or the like torn from the second web of material and adheres thereto so that it is entrained by the slip or the like held on the application cylinder by the folding grippers and applied with the slip or the like to the workpiece or to the open bottom.

It is convenient if the application cylinder has the glue application roll of a second adhesive applying system in engagement with it which provides the slips or pieces of tube, which are torn off or otherwise detached from the first and the second web of material, with a coating of glue in a correct format alignment.

DETAILED DESCRIPTION OF THE PREFERRED EMBODIMENTS

Figure 1:
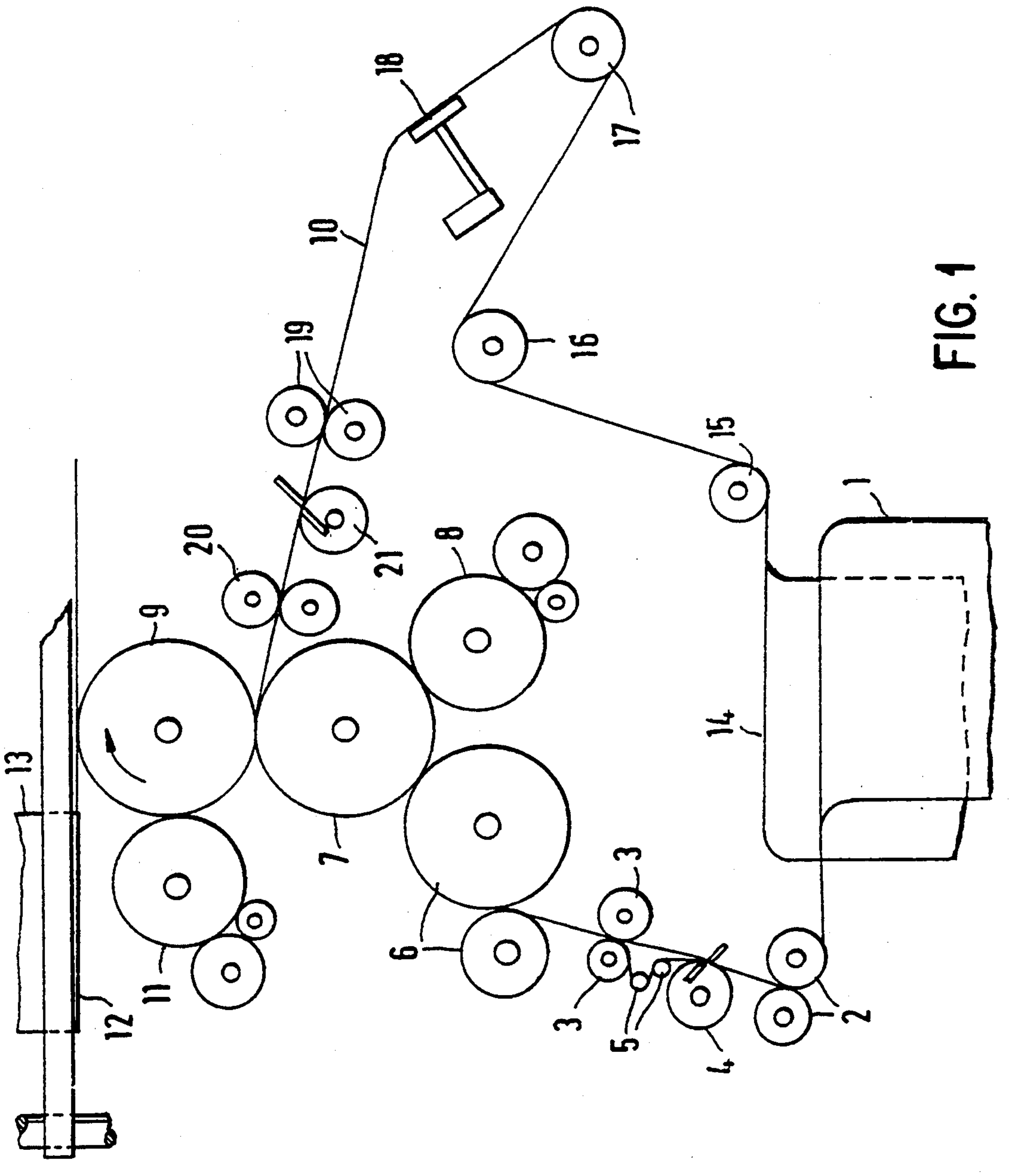
FIG. 1 is a schematic side elevational view of apparatus for applying slips or pieces of tube to a moving web or workpiece.

One working embodiment of the invention as shown in a diagrammatic side elevation will now be described in more detail reference to the drawing, whose single figure shows a device for the application of combined packages of slips and/or pieces of tube, whose slips and/or pieces of tube have been torn from separately supplied webs of material, to the drawn out bag bottoms.

A two-ply web 1, of which one ply consists of paper and the other one consists of synthetic resin, which are drawn off from supply rolls, not illustrated, is fed by the pair of feed rolls 2. The pair 2 of feed rolls is followed by a further pair of feed rolls 3, and between the two pairs 2 and 3 of rolls the transverse perforating device 4 and the guide rolls 5 are arranged, by which the synthetic resin web is off-set in relation to the paper web in the longitudinal direction. The tearing off of the individual two-ply pieces of web occurs between the pair 3 of feed rolls and the pair 6 of folding gripper cylinders, of which the cylinder provided the folding grippers is responsible for the further conveying of the double sheet. To this extent the device is comparable with the prior art device in accordance the said German patent 1,179,087.

The folding gripper cylinder of the pair 6 of cylinders then transfers the double sheet to a transfer cylinder 7 in the form of an intermediate cylinder. This cylinder moves the sheet or, respectively, the double sheet past an adhesive application device 8, by means of which the inner side of the slips is provided a coating of glue or adhesive with the correct format alignment.

Figure 2:
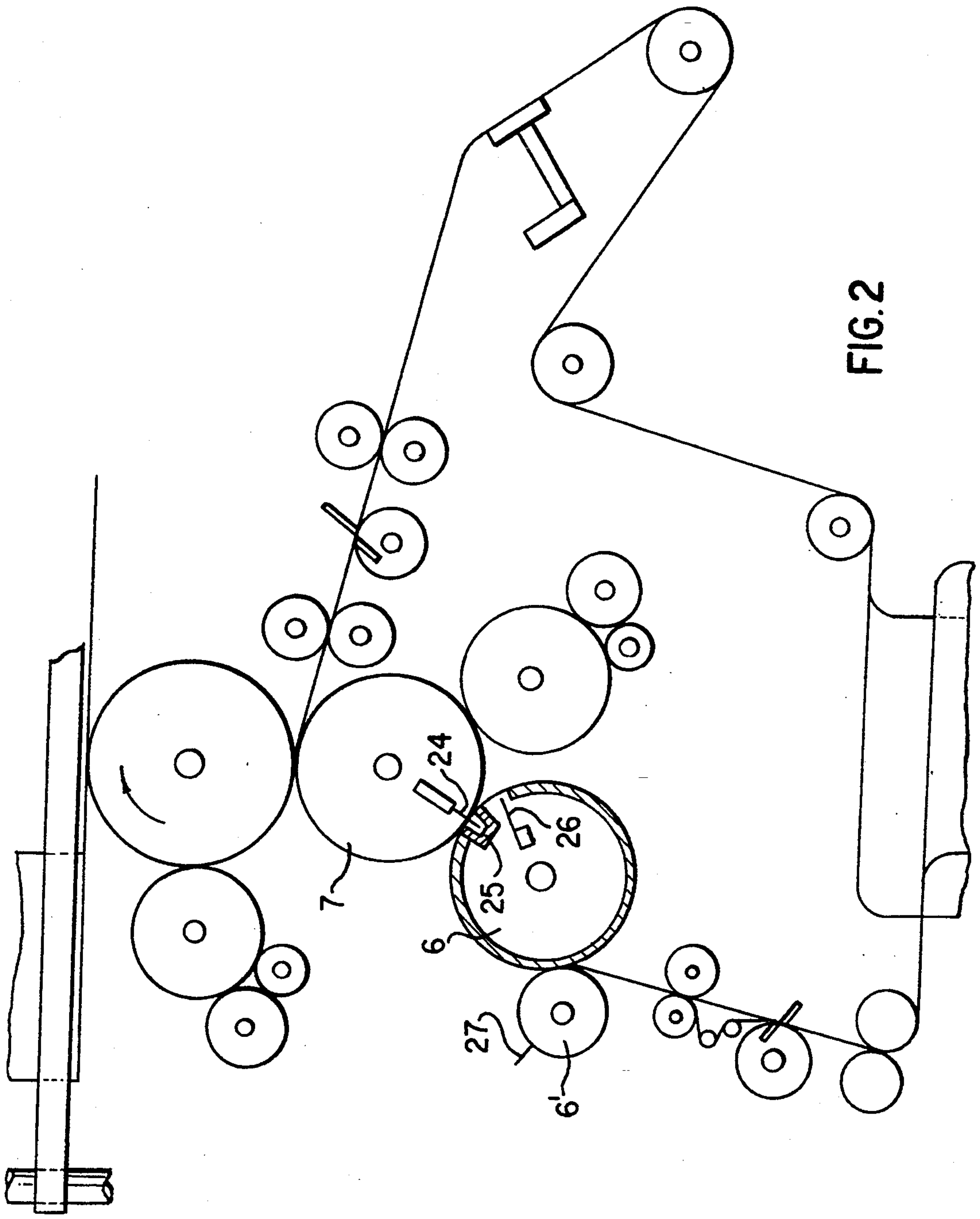
FIG. 2 is an enlarged detail of the apparatus of FIG. 1.

FIG. 2 shows that the transfer for intermediate cylinder 7 is provided a row of needles 24 for the purpose of receiving the slips or double slips in front of which row 24, as seen in the direction of rotation indicated by the arrow A, gripping tongues 26 are arranged in a recess of the gripping cylinder 6. The double slip torn off by the folding cylinder 6' of the folding gripper cylinder pair 6, 6' is pushed into the open gripping tongues 26 by the folding plate 27 mounted on the folding cylinder 6'. After the double slip is fixed, the row of needles 24 plunge into the transverse notch 25 of cylinder 6, perforating the double slip. The gripping tongues 26 open to release the double slip.

On further rotation of the intermediate cylinder 7 the folder bar, arranged in front of the row of needles, comes into contact with the folding grippers provided on the application folding gripper cylinder 9 so that the leading end of a tube web 10 is held by the folding gripper and as a result the latter tears off a piece of tube along a transverse perforation line. The supply of the tube web 10 is described in the following in more detail. This piece of tube then sticks to the coating of adhesive previously applied to the inner side of the double slips so that such double slips are entrained by the piece of tube held by the application folding gripper cylinder. On further rotation of the application folding gripper cylinder the package of slips or pieces of tube runs past the adhesive application system 11, by which the latter is provided the coating of glue in format. The package or stack of slips or pieces of tube prepared in this manner and provided adhesive is then thrust against the still open bottom 12 of a bag 13 by the application folding gripper cylinder 9.

After this the bottom is folded together in a known manner so that a double-ply valve tube is formed by the double slips and into it additionally a further piece of tube torn from the web 10 of tube is inserted.

The tube web 10 is firstly drawn off as a flat web 14 from a supply roll, not illustrated. It is then supplied via the rolls 15, 16 and 17 to the tube forming device 18, in which the flat web is laid together as a tube web 10. The tube 10 formed in this manner may have the same breadth as the eventual bottom, or it may be substantially narrower.

There is furthermore the possibility of having a tube web 10 which is broader than the finished bottom in the flat condition of the web so that by folding together the bottom the edges of the tube web are as well folded together on either side for reinforcement and are folded over.

The feed of the tube web 10 is performed by a pair of supply rolls 19 and 20, the web being provided with transverse perforations by the perforating device 21 between the pair of supply rolls 19 and 20 and the perforating device 21.

Using the above described device it is possible as well to have the web 14 in the form of a single ply or double ply one and to do out the tube forming station 18 so that an additional slip is applied to the slip or double slip conveyed by the intermediate cylinder 7. The web 1 may furthermore be in the form of a web of non-woven material so that after the formation of the bottom a filling valve, surrounded by a web of non-woven material is formed by folding the bottom together.

In case of need it is possible to do out the guide rolls 5 for off-setting a double ply web.

What is claimed is:

1. An apparatus for the application of adhesive coated slips or adhesive coated pieces of tube to a moving web or to workpieces being conveyed, comprising pairs of feed rolls for a first web of material and means for detaching the slips or pieces of tube from the first web of material and a transfer folding gripper cylinder for receiving and then transferring the slips or pieces of tube wherein an arrangement between an applying folding gripper cylinder (9) for the application of the slips or the pieces of tube, and the transfer folding cylinder (6) of an intermediate cylinder (7), which the applying folding cylinder (9) defines a roll nip, into which slips or pieces of tube run which are detached from a second web (1) of material, and which transfers the slips or pieces of tube which are detached from the first web of material and from the second web of material in an at least partly overlapping condition to the moving web or moving workpieces passing through the device, wherein the intermediate cylinder comprises gripping tongs (26) for receiving the slips or pieces of tube.

2. An apparatus for the application of adhesive coated slips or adhesive coated pieces of tube to a moving web or to workpieces being conveyed, comprising pairs of feed rolls for a first web of material and means for detaching the slips or pieces of tube from the first web of material and a transfer folding gripper cylinder for receiving and then transferring the slips or pieces of tube wherein an arrangement between an applying folding gripper cylinder (9) for the application of the slips or the pieces of tube, and the transfer folding cylinder (6) of an intermediate cylinder (7), which the applying folding cylinder (9) defines a roll nip, into which slips or pieces of tube run which are detached from a second web (1) of material, and which transfers the slips or pieces of tube which are detached from the first web of material and from the second web of material in an at least partly overlapping condition to the moving web or moving workpieces passing through the device, wherein the intermediate cylinder (7) comprises a row of needles (24) for receiving the slips or pieces of tube from the transfer folding gripper cylinder (6).

3. A device as claimed in claim 2 wherein the intermediate cylinder (7) comprises a folder bar in the direction of rotation before the row of needles (24), wherein said folder bar inserts the leading end of the detached slip or tube into folding grippers of the application folding gripper cylinder (9).

4. An apparatus for the application of adhesive coated slips or adhesive coated pieces of tube to a moving web or to workpieces being conveyed, comprising pairs of feed rolls for a first web of material and means for detaching the slips or pieces of tube from the first web of material and a transfer folding gripper cylinder for receiving and then transferring the slips or pieces of tube wherein an arrangement between an applying folding gripper cylinder (9) for the application of the slips or the pieces of tube, and the transfer folding cylinder (6) of an intermediate cylinder (7), which with the applying folding cylinder (9) defines a roll nip, into which slips or pieces of tube run which are detached from a second web (1) of material, and which transfers the slips or pieces of tube which are detached from the first web of material and from the second web of material in an at least partly overlapping condition to the moving web or moving workpieces passing through the device, wherein a glue application roll (8) of a glue application system is in engagement the intermediate cylinder (7), wherein said glue application roll provides the slips or pieces of tube with aligned coatings of glue.

5. An apparatus for the application of adhesive coated slips or adhesive coated pieces of tube to a moving web or to workpieces being conveyed, comprising pairs of feed rolls for a first web of material and means for detaching the slips or pieces of tube from the first web of material and a transfer folding gripper cylinder for receiving and then transferring the slips or pieces of tube wherein an arrangement between applying folding gripper cylinder (9) for the application of the slips or the pieces of tube, and the transfer folding cylinder (6) of an intermediate cylinder (7), which the applying folding cylinder (9) defines a roll nip, into which slips or pieces of tube run which are detached from a second web (1) of material, and which transfers the slips or pieces of tube which are detached from the first web of material and from the second web of material in an at least partly overlapping condition to the moving web or moving workpieces passing through the device, wherein a glue application roll (11) of a glue application system is in engagement the application folding gripper cylinder (9), wherein said roll (11) provides detached slips or tubes with coatings of glue.

6. An apparatus for the application of adhesive coated slips or adhesive coated pieces of tube to a moving web or to workpieces being conveyed, comprising pairs of feed rolls for a first web of material and means for detaching the slips or pieces of tube from the first web of material and a transfer folding gripper cylinder for receiving and then transferring the slips or pieces of tubes, wherein an arrangement between an applying folding gripper cylinder (9) for the application of the slips or the pieces of tube, and the transfer folding cylinder (6) of an intermediate cylinder (7), which with the applying folding cylinder (9) defines a roll nip, into which slips or pieces of tube run which are detached from a second web (1) of material, and which transfers the slips or pieces of tube which are detached from the first web of material and from the second web of material in an at least partly overlapping condition to the moving web or moving workpieces passing through the device, wherein a glue application roll (8) of a glue application system is in engagement the intermediate cylinder (7), wherein said glue application roll provides the slips or pieces of tube aligned coatings of glue, wherein the intermediate cylinder (7) comprises a folder bar in the direction of rotation before the row of needles (24), wherein said folder bar inserts the leading end of the detached slip or tube into folding grippers of the application folding gripper cylinder (9), and wherein a glue application roll (11) of a glue application system is in engagement the application folding gripper cylinder (9), wherein said roll (11) provides detached slips or tubes with coatings of glue.

7. A device as claimed in claim 6, wherein the intermediate cylinder comprises gripping tongs (26) for receiving the slips or pieces of tube.

* * * * *